(12) United States Patent
Lee et al.

(10) Patent No.: US 11,108,069 B2
(45) Date of Patent: Aug. 31, 2021

(54) METHOD FOR MANUFACTURING MEMBRANE ELECTRODE ASSEMBLY INCLUDING TRANSFERRING ELECTRODE LAYER TO ELECTROLYTE MEMBRANE BY GAS PRESSURE

(71) Applicant: KOLON INDUSTRIES, INC., Seoul (KR)

(72) Inventors: Jin-Hwa Lee, Yongin-si (KR); Jun-Young Kim, Yongin-si (KR)

(*) Notice: Subject to any disclaimer, the term of this patent is extended or adjusted under 35 U.S.C. 154(b) by 118 days.

(21) Appl. No.: 16/338,159

(22) PCT Filed: Sep. 29, 2017

(86) PCT No.: PCT/KR2017/011069
§ 371 (c)(1),
(2) Date: Mar. 29, 2019

(87) PCT Pub. No.: WO2018/062972
PCT Pub. Date: Apr. 5, 2018

(65) Prior Publication Data
US 2019/0245230 A1    Aug. 8, 2019

(30) Foreign Application Priority Data

Sep. 30, 2016  (KR) .................. 10-2016-0126298
Sep. 29, 2017  (KR) .................. 10-2017-0128010

(51) Int. Cl.
*H01M 8/1004*     (2016.01)
*H01M 4/88*       (2006.01)
(Continued)

(52) U.S. Cl.
CPC ....... *H01M 8/1004* (2013.01); *H01M 4/8814* (2013.01); *H01M 4/8828* (2013.01);
(Continued)

(58) Field of Classification Search
CPC ............ H01M 8/1004; H01M 8/1018; H01M 4/8814; H01M 4/8828; H01M 4/8882; H01M 4/8896; H01M 4/926
(Continued)

(56) References Cited

U.S. PATENT DOCUMENTS

2001/0007270 A1    7/2001  Balduin et al.
2002/0192548 A1*   12/2002 Schaefer ............ H01M 8/1004
                                                      429/209
(Continued)

FOREIGN PATENT DOCUMENTS

CN    101752570 A    6/2010
CN    103310991 A    9/2013
(Continued)

OTHER PUBLICATIONS

International Search Report for PCT/KR2017/011069 dated Feb. 1, 2018 [PCT/ISA/210].
Chinese office action dated Jun. 16, 2021.

*Primary Examiner* — Sean P Cullen
(74) *Attorney, Agent, or Firm* — Harvest IP Law, LLP

(57) ABSTRACT

A method for manufacturing a membrane electrode assembly for a fuel cell, in which uniform pressure is applied to the entire area of an electrode during a transferring process to ensure uniformity of products. The method includes an electrode forming step of forming an electrode layer by coating an electrode slurry on a support; a transferring step of aligning the electrode layer on both surfaces of an electrolyte membrane and applying heat and pressure to transfer the electrode layer; and removing the support, wherein in the transferring step, gas pressure is applied to a gas pressure platen of a stretchable material to transfer the electrode layer to the electrolyte membrane.

10 Claims, 7 Drawing Sheets

(51) Int. Cl.
*H01M 8/1018* (2016.01)
*H01M 4/92* (2006.01)

(52) U.S. Cl.
CPC ....... *H01M 4/8882* (2013.01); *H01M 4/8896* (2013.01); *H01M 4/926* (2013.01); *H01M 8/1018* (2013.01); *Y02P 70/50* (2015.11)

(58) Field of Classification Search
USPC .................................................. 429/483, 535
See application file for complete search history.

(56) References Cited

U.S. PATENT DOCUMENTS

| | | | |
|---|---|---|---|
| 2003/0205605 A1* | 11/2003 | Gray | B29C 59/04 226/172 |
| 2005/0236765 A1 | 10/2005 | Puffer | |
| 2006/0075630 A1 | 4/2006 | Valentine | |
| 2007/0129237 A1 | 6/2007 | Kadotani et al. | |
| 2008/0118805 A1* | 5/2008 | Han | H01M 4/8626 429/483 |
| 2009/0104508 A1 | 4/2009 | Lee | |
| 2009/0317685 A1* | 12/2009 | Yajima | H01M 8/04201 429/492 |
| 2011/0217621 A1* | 9/2011 | Felix | H01M 4/8814 429/492 |
| 2013/0118684 A1 | 5/2013 | Ishikawa et al. | |
| 2014/0377685 A1* | 12/2014 | Hong | H01M 4/8814 429/492 |

FOREIGN PATENT DOCUMENTS

| | | |
|---|---|---|
| JP | 64-16886 A | 1/1989 |
| JP | 10-297192 A | 11/1998 |
| JP | 2000-219540 A | 8/2000 |
| JP | 2004-296216 A | 10/2004 |
| JP | 2006-134611 A | 5/2006 |
| JP | 2007-134202 A | 5/2007 |
| JP | 2008269810 A * | 11/2008 |
| JP | 2009-140653 A | 6/2009 |
| JP | 2010-153188 A | 7/2010 |
| JP | 2011-187414 A | 9/2011 |
| JP | 2013-103346 A | 5/2013 |
| JP | 2014-141094 A | 8/2014 |
| JP | 2017-103220 A | 6/2017 |
| KR | 10-2004-0104839 A | 12/2004 |
| KR | 10-2007-0039360 A | 4/2007 |
| KR | 10-2009-0132420 A | 12/2009 |
| KR | 10-2013-0050154 A | 5/2013 |
| KR | 10-2013-0061272 A | 6/2013 |
| KR | 10-2017-0019171 A | 2/2017 |
| WO | 2006002878 A1 | 1/2006 |
| WO | 2010/075492 A1 | 7/2010 |

* cited by examiner

METHOD FOR MANUFACTURING MEMBRANE ELECTRODE ASSEMBLY INCLUDING TRANSFERRING ELECTRODE LAYER TO ELECTROLYTE MEMBRANE BY GAS PRESSURE

CROSS REFERENCE TO RELATED APPLICATIONS

This application is a National Stage of International Application No. PCT/KR2017/011069 filed Sep. 29, 2017, claiming priority based on Korean Patent Application Nos. 10-2016-0126298 filed Sep. 30, 2016 and 10-2017-0128010 filed Sep. 29, 2017.

TECHNICAL FIELD

The present invention relates to a method for manufacturing a membrane electrode assembly for a fuel cell, and more specifically, to a method for manufacturing a membrane electrode assembly for a fuel cell, the method which ensures uniformity of products by applying uniform pressure to the entire area of an electrode in a transfer process.

BACKGROUND ART

In general, a fuel cell refers to a battery which directly converts chemical energy generated by oxidation of a fuel into electric energy. Although the fuel cell is basically similar to a normal chemical cell, the fuel cell performs the battery reaction by continuously supplying a reactant from the outside and continuously removing a reaction product to the outside of the system differently from the chemical cell which performs a battery reaction within a closed system.

Such a fuel cell includes a molten carbonate electrolyte-type fuel cell which is operated at a high temperature of 500 to 700° C., a phosphoric acid electrolyte-type fuel cell which is operated at about 200° C., and an alkaline electrolyte-type fuel cell, a polymer electrolyte-type fuel cell or the like which is operated at 100° C. to room temperature. The polymer electrolyte-type fuel cell among those fuel cells is again divided into a proton exchange membrane fuel cell (PEMFC) using hydrogen gas as a fuel, a direct methanol fuel cell (DMFC) using a liquid methanol as the fuel, and the like.

The polymer electrolyte-type fuel cell has been spotlighted as a clean energy source capable of replacing petroleum energy. Above all, since the polymer electrolyte-type fuel cell not only has high power density and energy conversion efficiency, but also can be operated even at room temperature, the polymer electrolyte-type fuel cell can be widely used in fields of an electric vehicle, a household power generation system, an electric appliance for leisure, and the like.

When looking into configuration of such a fuel cell referring to FIG. 1, a membrane electrode assembly (MEA) is positioned at the innermost side of the fuel cell, and the membrane electrode assembly includes a polymer electrolyte membrane 10 which is capable of moving a hydrogen cation (proton), and an electrode layer which is applied to both surfaces of the electrolyte membrane 10 enabling hydrogen and oxygen to perform a reaction process, i.e., a cathode 12 (air electrode) and an anode 14 (fuel electrode).

Further, a gas diffusion layer (GDL) 16 and a gasket 18 are successively stacked on an outer portion of the electrode membrane, i.e., an outer portion in which the cathode 12 and the anode 14 are positioned, a separator 20 in which a flow field is formed to supply a fuel and discharge water generated by a reaction is positioned at an outer side of the gas diffusion layer 16, and an end plate 30 for supporting and fixing the respective components is coupled to the separator 20 at an outermost side of the fuel cell.

Therefore, an oxidation reaction of hydrogen is proceeded in the anode 14 of a fuel cell stack to generate hydrogen ions (proton) and electrons. At this time, the generated hydrogen ions and electrons are each moved to a cathode 12 through the polymer electrolyte membrane 10 and the separator 20 such that water is produced from the cathode 12 through an electrochemical reaction in which the hydrogen ions and the electrons moved from the anode 14 and oxygen in the air are participated, and electric energy finally generated from a flow of such electrons is supplied to a load of requiring electric energy through a current collector (not shown) of the end plate 30.

In order to manufacture a membrane electrode assembly (MEA), a technology of positioning an anode and a cathode on both surfaces of a polymer electrolyte membrane is required. The technology is mainly classified into a catalyst coated substrate (CCS) method and a catalyst coated membrane (CCM) method. The CCS method is a method for adhering the catalyst layer-formed gas diffusion layer to a polymer electrolyte membrane through hot pressing after forming a catalyst layer on a gas diffusion layer (GDL) including a microporous layer (MPL), and the CCM method is mainly a method for directly adhering the catalyst layer to the polymer electrolyte membrane.

The CCM method is divided into a direct coating method and a decal lamination method, wherein the direct coating method is a method directly coating an electrode slurry on a membrane to form an electrode, and the decal lamination method is a method for forming an electrode layer on a coating base film, applying heat and pressure to the electrode layer formed on the coating base film to transfer the electrode layer to a polymer electrolyte membrane.

The direct coating method has advantages of price reduction and process simplification by removing a transfer process without using an expensive transfer film. However, the direct coating method has a disadvantage that it is difficult to ensure processability for mass production due to easily changing characteristics of the electrolyte membrane when the electrolyte membrane comes into contact with a catalyst slurry or is exposed to water.

The decal lamination method is a method for using a process of coating an electrode slurry in which a catalyst, an ionomer and a solvent are mixed on a support of a release film such as Teflon™ film (polytetrafluorethylene), an imide film or the like and drying the electrode slurry coated on the support of the release film to produce an electrode layer (anode and cathode), aligning the electrode layer on each of both surfaces of an electrolyte membrane (ion conductive membrane), and applying heat and pressure to the electrode layer-aligned electrolyte membrane to transfer the electrode layer to the electrolyte membrane. The decal lamination method generally transfers an electrode to a polymer electrolyte membrane using a plate type hot press or a roll type press.

When a heat transfer process is generally performed using a plate type press or a roll type press when performing a decal lamination operation by the above-described CCM method, there have been problems that it is difficult to apply an even pressure to the entire area of the electrode such that it is difficult to ensure uniformity of products accordingly, and product qualit is deteriorated to lower performance of a fuel cell.

RELATED ART DOCUMENTS

Korean Patent Laid-open Publication No. 2004-0104839 (Publication date: Dec. 13, 2004)
Korean Patent Laid-open Publication No. 2007-0039360 (Publication date: Apr. 11, 2007)
Korean Patent Laid-open Publication No. 2009-0132420 (Registration date: Dec. 30, 2009)
Korean Patent Laid-open Publication No. 2013-0050154 (Publication date: May 15, 2013)

DISCLOSURE

Technical Problem

The present invention has been made to solve the above-described problems, and an objective of the present invention is to provide a method for manufacturing a membrane electrode assembly for a fuel cell, in which uniform pressure is applied to the entire area of an electrode to ensure uniformity of products.

Technical Solution

The method for manufacturing a membrane electrode assembly for a fuel cell according to the present invention comprises: an electrode forming step of forming an electrode layer by coating an electrode slurry on a support; a transfer step of aligning the electrode layer on each of both surfaces of an electrolyte membrane and applying heat and pressure to transfer the electrode layer; and a step of removing the support, wherein in the transfer step, gas pressure is applied to a gas pressure platen of a stretchable material to transfer the electrode layer to the electrolyte membrane.

When applying gas pressure to the gas pressure platen in the transfer step, a chamber having gas filled therein is used. The gas filled in the chamber preferably is air. The gas pressure platen preferably is a silicone pad or a silicone rubber pad.

The transfer step comprises disposing a gas pressure platen on a top side of a support, closely adhering the support and the gas pressure platen to each other to form a vacuum between the support and the gas pressure platen, and pressurizing the support by applying gas pressure and temperature from an upper side using a chamber filled with gas.

It is preferable to maintain a transfer temperature of 50 to 200° C. and a transfer pressure of 5 to 200 kgf/cm².

The support includes any one selected from the group consisting of a Teflon™ film (polytetrafluoroethylene film) an imide film, a polyester film, a polyimide film, a polyamide film, a polyolefin film, a chlorine or fluorine-substituted polyolefin film, a perfluorinated polyolefin copolymer film, and a vinyl-based polymer film.

The electrode slurry includes a slurry comprising a catalyst, an ionomer or a carbon-based material, and a solvent.

The electrode forming step is performed by coating an electrode slurry to a thickness of 10 to 200 μm on the support. The electrode forming step comprises the step of performing a natural drying, vacuum drying, hot air drying, near infrared ray (NIR) drying, or superheated steam drying process at room temperature to 150° C. after performing a coating process.

Advantageous Effects

A method for manufacturing a membrane-electrode assembly according to the present invention allows uniform pressure to be applied to the entire area of the electrode in the transfer process to ensure uniformity of products, thereby improving the quality and improving the performance of the fuel cell.

BEST MODE FOR CARRYING OUT THE INVENTION

Hereinafter, embodiments of the present invention will be described in detail so that a person skilled in the art may easily implement the present invention. However, the present invention may be implemented in various different forms, and therefore, the present invention is not limited to the illustrated embodiments.

A membrane electrode assembly for a fuel cell according to an embodiment of the present invention may be applied to various electrolyte-type fuel cells including a phosphoric acid electrolyte-type fuel cell (PAFC), a polymer electrolyte-type fuel cell such as a proton exchange membrane fuel cell (PEMFC), a direct methanol fuel cell (DMFC) or a high temperature PEMFC, and the like.

Figure 1:
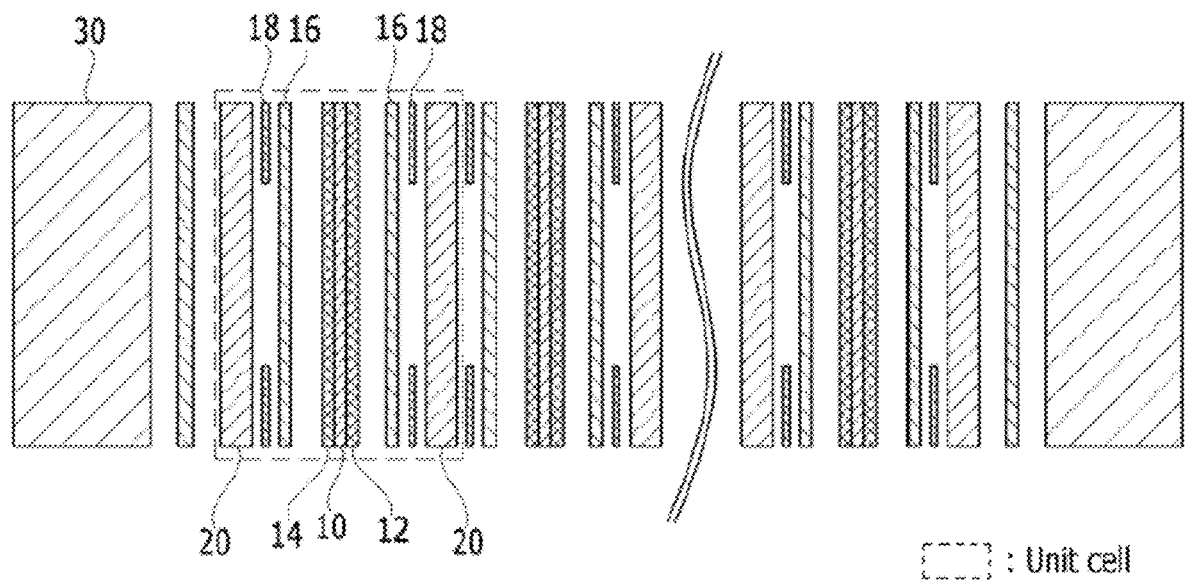
FIG. 1 is a schematic block diagram of a general fuel cell.
Figure 2:
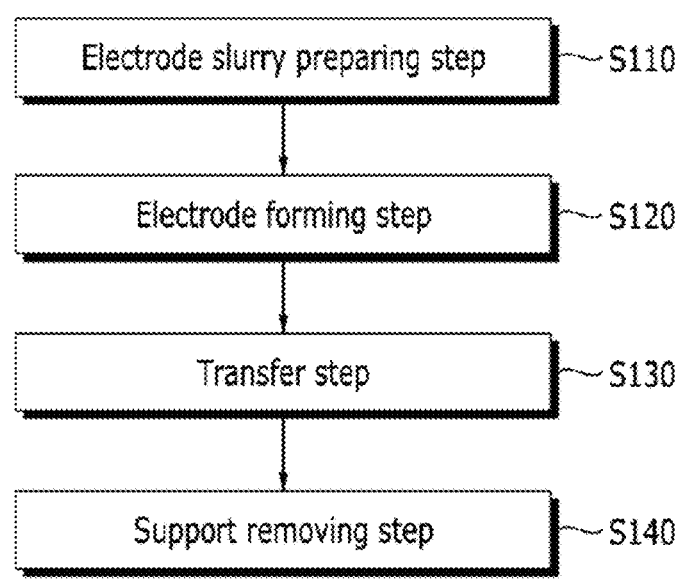
FIG. 2 is a flowchart showing a method for manufacturing a membrane electrode assembly for a fuel cell according to an embodiment of the present invention.
Figure 3:
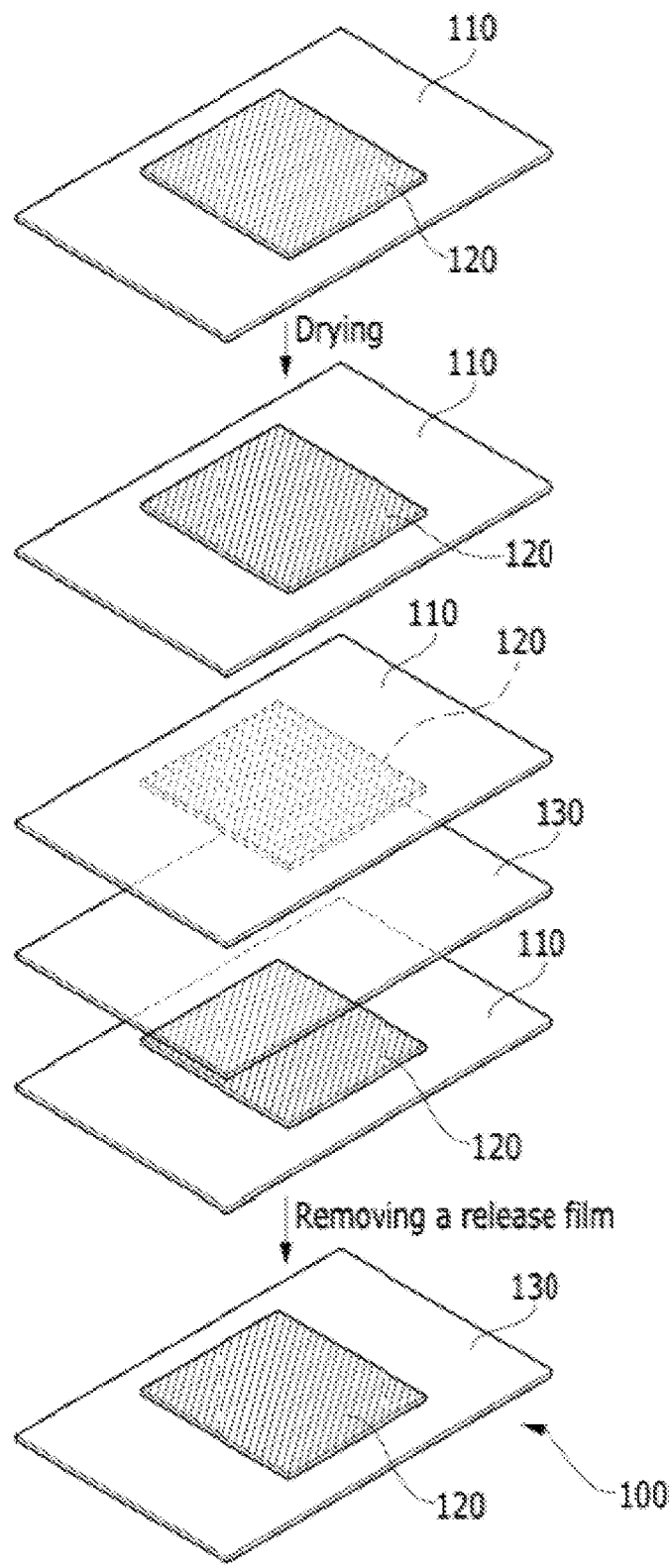
FIG. 3 is a process drawing showing a method for manufacturing a membrane electrode assembly for a fuel cell according to an embodiment of the present invention.

FIG. 2 is a flowchart showing a method for manufacturing a membrane electrode assembly for a fuel cell according to an embodiment of the present invention, and FIG. 3 is a process drawing showing a method for manufacturing a membrane electrode assembly for a fuel cell according to an embodiment of the present invention. As illustrated, a method for manufacturing a membrane electrode assembly for a fuel cell according to the present invention comprises an electrode slurry preparing step (S110), an electrode forming step (S120), a transfer step (S130), and a support removing step (S140).

The electrode slurry preparing step (S110) is a step of preparing an electrode slurry by mixing a catalyst, an ionomer or a carbon-based material, and a solvent. The electrode slurry is not limited to a mixture comprising the catalyst, the ionomer or the carbon-based material, and the solvent, but may include materials that are usable as a slurry for forming an electrode layer or a catalyst layer in a fuel cell.

The catalyst may preferably include one, or two or more selected from the group consisting of platinum, ruthenium, osmium, a platinum-ruthenium alloy, a platinum-osmium alloy, a platinum-palladium alloy, a platinum-M alloy, and mixtures thereof, may more preferably include platinum, a platinum-ruthenium alloy, a platinum-osmium alloy, a platinum-palladium alloy, a platinum-M alloy, and may most preferably include platinum. At this time, the M is preferably a transition metal selected from the group consisting of gallium (Ga), titanium (Ti), vanadium (V), chromium (Cr), manganese (Mn), iron (Fe), cobalt (Co), nickel (Ni), copper (Cu), zinc (Zn), tin (Sn), molybdenum (Mo), tungsten (W), ruthenium (Ru), rhodium (Rh), iridium (Ir), and combinations thereof.

The ionomer, as a polymer of bridging a copolymer of ethylene and acrylic acid or methacrylic acid with metallic ions such as $Ca^{2+}$, $Ba^{2+}$, $Zn^{2+}$ or the like, may include reaction products of monomers including phthalazinone and a phenol group and at least one sulfonated aromatic compound, i.e., sulfonated poly(phthalazinone ether ketone), sulfonated poly(phthalazinone or sulfone), sulfonated aromatic polymer compounds, a copolymer of tetrafluoroethylene and fluorovinyl ether, and others.

Although the carbon-based material may preferably include one or more selected from the group consisting of carbon powder, carbon black, carbon fiber, fullerene, graphene, carbon nanotube, carbon nanowire, carbon nanohorn, carbon nanoring, and mixtures thereof, the carbon-based material is not limited thereto.

The solvent may include water, and one or mixtures of two or more thereof selected from alcohols including $C_1$-$C_5$ saturated or unsaturated hydrocarbons as a main chain. However, the solvent is not limited thereto, but may include any materials which are generally used in the art.

Dispersion degree and viscosity of the electrode slurry are very important in the formation of an electrode layer (catalyst layer) using a coater. Viscosity of the electrode slurry is preferably adjusted to 10 cps to 20,000 cps. According to types of solvents used, the electrode slurry may include water or an alcohol solvent-based electrode slurry having excellent coating properties at low viscosity and an organic solvent-based electrode slurry having excellent coating properties at high viscosity.

The electrode forming step (S120) is a step of forming an electrode layer 120 by coating an electrode slurry on a support 110. The electrode forming step (S120) comprises the step of coating the electrode slurry to a thickness of 5 to 200 μm on the support 110. The electrode forming step (S120) further comprises the step of performing a natural drying process, a vacuum drying process, a hot air drying process, a near infrared ray (NIR) drying process, a superheated steam drying process or the like at room temperature to 150° C. after performing the coating process.

The support 110 includes any one selected from the group consisting of a Teflon™ film (polytetrafluoroethylene film), an imide film, a polyester film, a polyimide film, a polyamide film, a polyolefin film, a chlorine or fluorine-substituted polyolefin film, a perfluorinated polyolefin copolymer film, and a vinyl-based polymer film.

When coating an electrode slurry on a support (base material), it is preferable to uniformly coat the dispersed electrode slurry to a dry thickness of 10 to 200 μm on the support (base material) after continuously of intermittently transferring a dispersed electrode slurry to a coater. More specifically, after continuously transferring the dispersed electrode slurry to a coater such as a die coater, a gravure coater, a bar coater, a comma coater, or the like through a pump, the dispersed electrode slurry is uniformly coated to form an electrode layer (catalyst layer) with a wet thickness of 5 to 200 μm, more preferably 10 to 100 μm, on the support (base material), and the dispersed electrode slurry coated on the support (base material) passes through a drying furnace which is maintained to a predetermined temperature to volatilize the solvent. Methods of coating and drying the electrode slurry on the support are not limited to the above-described methods.

The electrode forming step (S120) preferably comprises drying the electrode layer 120 at room temperature to 150° C. for 5 minutes to 24 hours.

Figure 4:
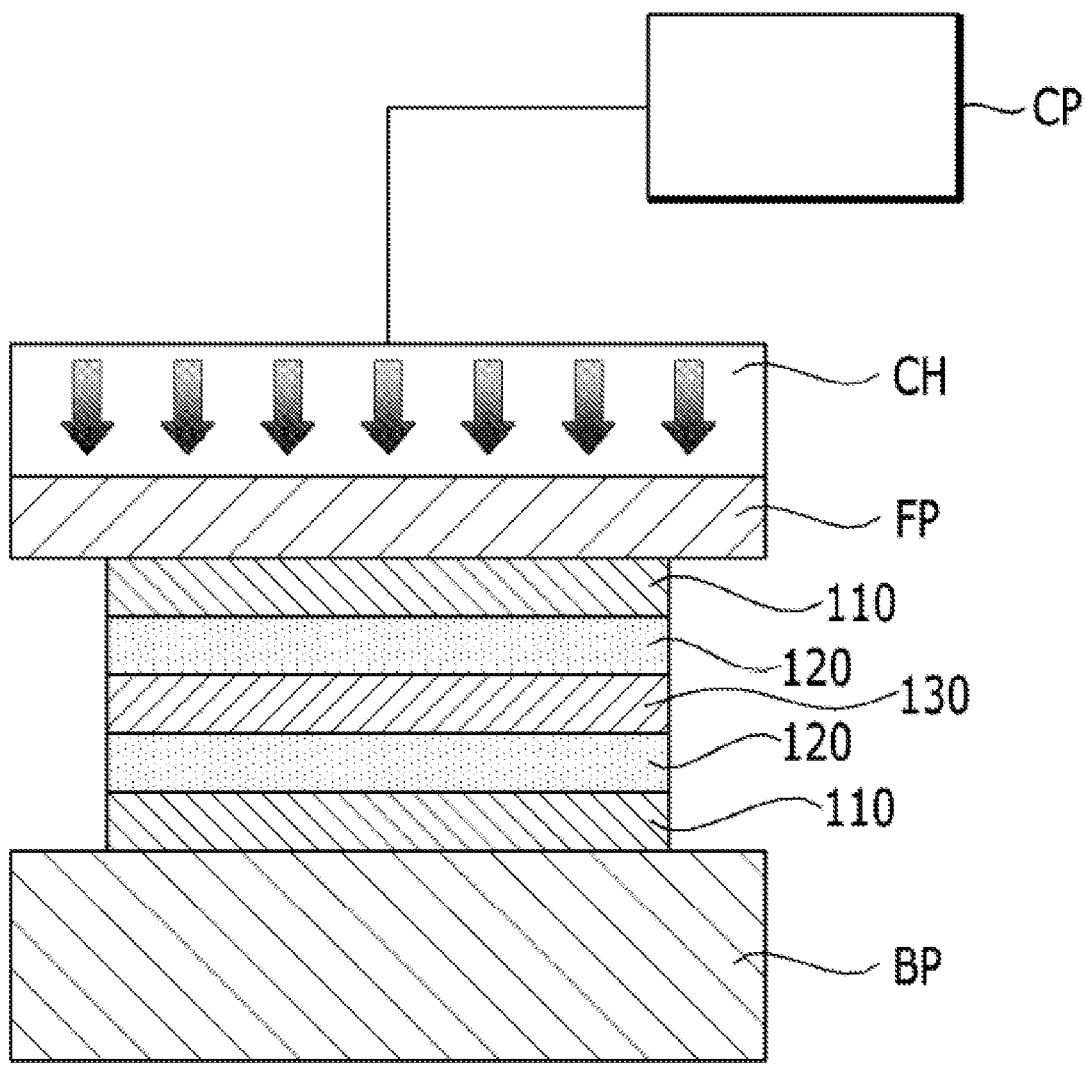
FIG. 4 is a drawing showing an example of performing a transfer process by carrying out a pressing (gas pressing) operation using gas pressure in a transfer step of FIG. 2.

Referring to FIG. 4, a transfer step (S130) may be performed by cutting a dried electrode layer 120 and a support 110 to a required size after performing the electrode forming step (S120). The process drawing of FIG. 3 shows a state that the support 110 is not cut.

The transfer step (S130) is a step of aligning the electrode layer 120 on each of both surfaces of an electrolyte membrane 130 to apply heat and pressure, thereby transferring the electrode layer 120. The transfer step (S130) comprises applying gas pressure to a gas pressure platen FP of a stretchable material to transfer the electrode layer 120 to the electrolyte membrane 130. A process of applying gas pressure to the gas pressure platen FP in the transfer step (S130) comprises disposing the electrode layer 120 obtained by coating the electrode slurry on the support 110 in the electrode forming step (S120) such that the electrode layer 120 comes into contact with an electrolyte membrane, mounting the electrode layer 120 on a base plate BP, disposing the gas pressure platen FP on a top side of the support 110, closely adhering the support 110 and the gas pressure platen FP to each other to form a vacuum between the support 110 and the gas pressure platen FP, and pressurizing the support 110 by applying gas pressure and temperature from an upper side using a chamber CH filled with gas.

Although the gas filled in the chamber CH is preferably air, the gas is not limited thereto, but may include various gases including nitrogen and the like. The gas is supplied from a compressor CP. Although the gas pressure platen FP preferably includes a silicone pad or a silicone rubber pad, the gas pressure platen FP is not limited thereto, but may include various stretchable materials. The base plate BP is made of a rigid plate of a metallic material or the like, and the base plate BP is comprised of a heater for performing a heating process and a cooling line for performing a cooling process.

The chamber CH may have various shapes basically including a rectangular shape. An O-ring part for sealing or a part of other sealing method is added to the chamber CH, and a delta pressure ΔP is maintained between the chamber CH and the O-ring. A pump and a vacuum hole for maintaining a vacuum are provided at a lower side the chamber CH. Since the vacuum is required to securing adhesion between the support 110 and the gas pressure platen FP, vacuum lines with various shapes from the vacuum hole are required.

Meanwhile, the chamber CH includes a heater for heating a gas and a cooling line for cooling the gas, and includes various pressure instruments and pressure controllers including booster valves, solenoid valves for vents, and others which are capable of maintaining internal pressure.

When the electrode layer 120 is transferred to the electrolyte membrane 130 by applying gas pressure and temperature to the gas pressure platen FP of a stretchable material using the chamber CH, transfer defect rate is reduced, and pressure distribution for each location is uniformized (refer to FIG. 5B), thereby enabling quality of a product to be improved (reduction of interfacial resistance and improvement of interfacial binding properties). Further, electrode layers with different thicknesses can be laminated at the same time (refer to FIG. 6B), and a plurality of electrode layers are stacked to enable a transfer process to be performed.

The electrolyte membrane 130 can be used without a special restriction if the electrolyte membrane 130, as an ion conductive membrane, is material having mechanical strength of the level capable of forming a film and high electrochemical stability. Moreover, the ion conductive membrane may include hydrocarbon-based polymer electrolyte membranes, fluorine-based polymer electrolyte membranes, and mixtures or copolymers of one or more thereof. Specific examples of the fluorine-based polymer electrolyte membranes may include a copolymer of tetrafluoroethylene and fluorovinyl ether. A fluorovinyl ether moiety has a function of conducting hydrogen ions. The copolymer is commercially available since it is sold under the trade name Nafion of Dupont Corporation.

It is preferable to maintain a transfer temperature of 50 to 200° C. and a transfer pressure of 5 to 200 kgf/cm$^2$. Tranferring of an electrode layer on a support (base material) may not be adequately performed when the transfer temperature is less than 50° C., and it is apprehended that there may be a structural change in the electrode layer due to change of an ionomer within an electrolyte membrane when the transfer temperature is more than 200° C. Transferring from the support (base material) to the electrolyte membrane is not performed when the transfer pressure is less than 5 kgf/cm$^2$, and the electrode layer (catalyst layer) is excessively pressed to cause a drop in performance due to a physical damage to the electrolyte membrane or collapse of a pore structure within the electrode layer when the transfer pressure is more than 200 kgf/cm$^2$.

The support removing step (S140) is a step of removing a support 110 after performing the transfer step (S130). A membrane electrode assembly 100 is completed by removing the support 110 and performing a cutting process as necessary.

Figure 5A:
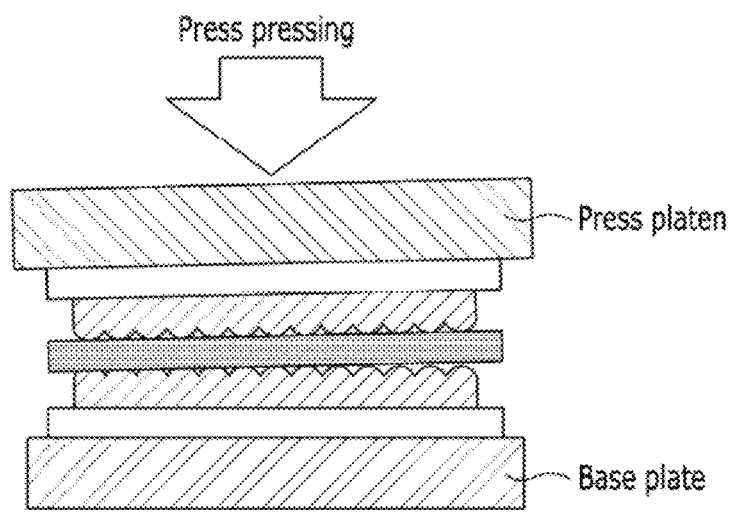
FIGS. 5A and 5B are explanation drawings showing a method (FIG. 5A) of carrying out a pressing operation by a conventional press and a method (FIG. 5B) of carrying out a gas pressing operation of the present invention when pressing products with the same thickness.
Figure 5B:
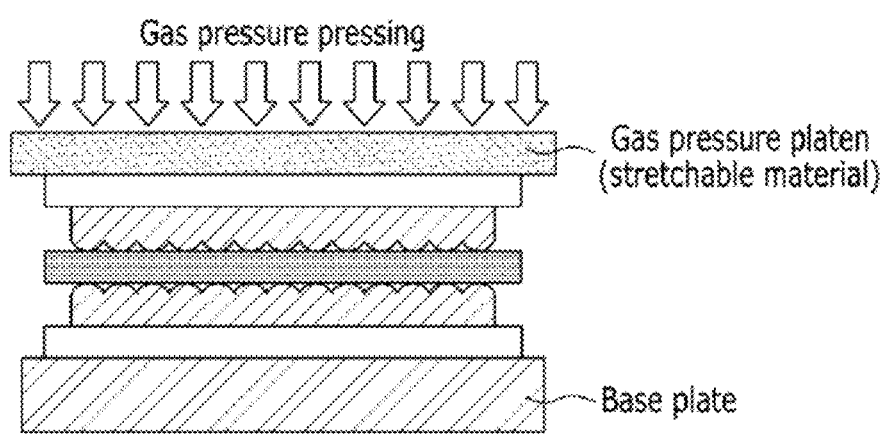
Figure 6A:
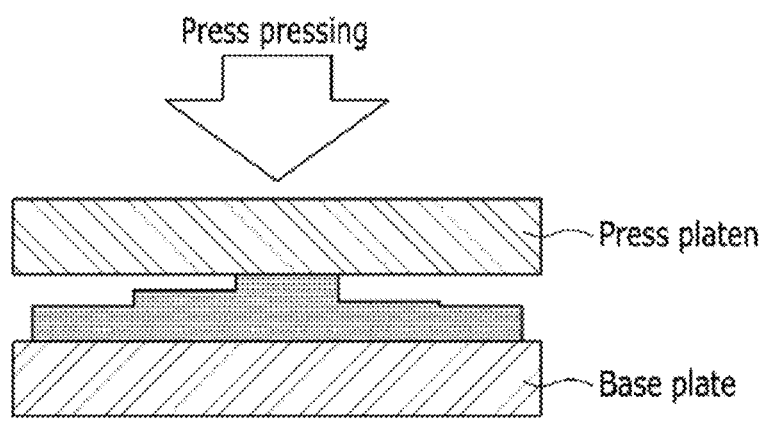
FIGS. 6A and 6B are explanation drawings showing a method (FIG. 6A) of carrying out a pressing operation by a conventional press and a method (FIG. 6B) of carrying out a gas pressing operation of the present invention when pressing products with different thicknesses.
Figure 6B:
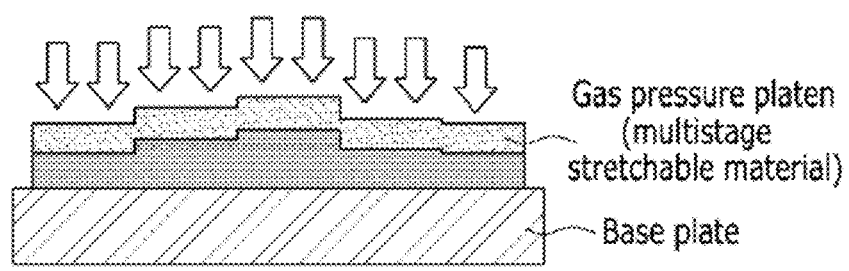

FIGS. 5A and 5B are explanation drawings showing comparison results obtained by comparing a method (FIG. 5A) of carrying out a pressing operation by a conventional press with a method (FIG. 5B) of carrying out a gas pressing operation of the present invention when pressing products with the same thickness. FIGS. 6A and 6B are explanation drawings showing comparison results obtained by comparing a method (FIG. 6A) of carrying out a pressing operation by a conventional press with a method (FIG. 6B) of carrying out a gas pressing operation of the present invention when pressing products with different thicknesses.

As shown in FIGS. 5A and 5B and FIGS. 6A and 6B, when performing a pressing process by applying gas pressure (pneumatic pressure or the like) to a gas pressure platen of a stretchable material in the present invention compared to when performing the pressing process using a plate type press or a roll type press, a phenomenon that the products are inclined is prevented when pressing inclined products as illustrated in FIG. 5A or products with partially different thicknesses as illustrated in FIG. 6A, and the pressing process can be performed such that the entire pressing surface may have uniform surface pressure distribution as illustrated in FIGS. 5B and 6B.

Figure 7:
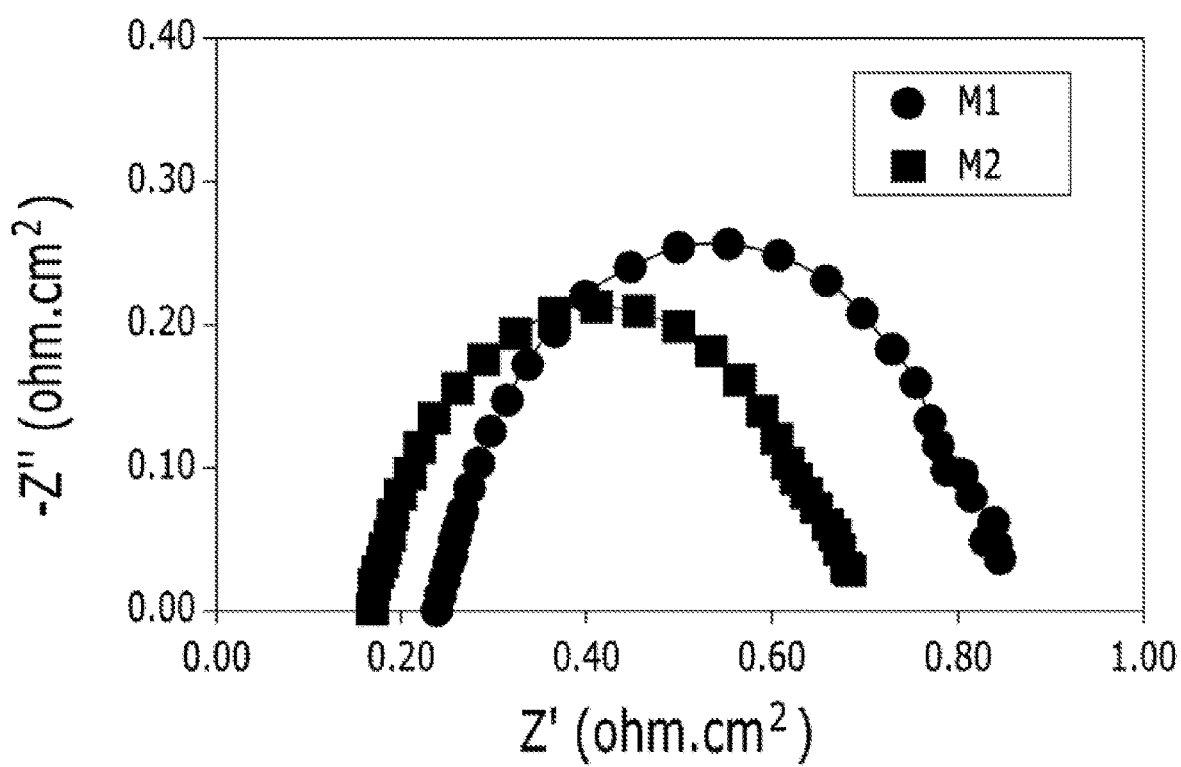
FIG. 7 and FIG. 8 are graphs showing comparison results obtained by comparing alternating current impedances in a constant current mode of a membrane electrode assembly M1 manufactured by the method for carrying out the pressing operation by the conventional press and a membrane electrode assembly M2 manufactured by the method for carrying out the gas pressing operation of the present invention.
Figure 8:
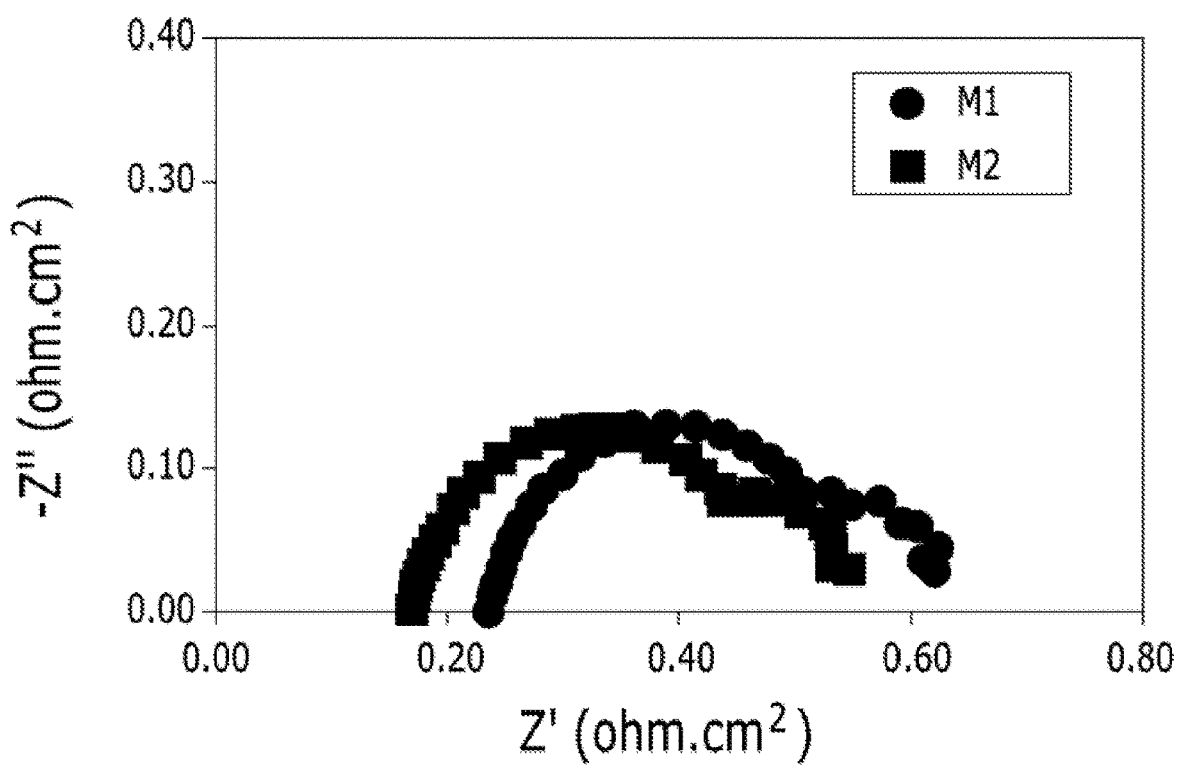

FIG. 7 and FIG. 8 are graphs showing comparison results obtained by comparing alternating current impedances in a constant current mode of a membrane electrode assembly M1 manufactured by the method for carrying out the pressing operation by the conventional press and a membrane electrode assembly M2 manufactured by the method for carrying out the gas pressing operation of the present invention.

Impedance measurement values represent result values obtained after performing an accelerated stress test (AST) by electrochemical impedance spectroscopy (EIS), and a lateral X-axis is an impedance real part Z' and a longitudinal Y-axis is an impedance imaginary part Z" in the graphs. A real part value at a point where an impedance curve and the lateral X-axis meet, as an ohmic resistance value, is a resistance component including polymer electrolyte membrane resistance and interfacial resistance. FIG. 7 is a graph obtained by graphing values measured at a current density of 0.3 A/cm$^2$, and FIG. 8 is a graph obtained by graphing values measured at a current density of 1 A/cm$^2$.

As illustrated, it can be seen that an ohmic resistance value of the membrane electrode assembly M2 manufactured by the method for carrying out the gas pressing operation of the present invention is smaller than that of the membrane electrode assembly M1 manufactured by the method for carrying out the pressing operation by the conventional press. Therefore, the membrane electrode assembly M2 manufactured by the method for carrying out the gas pressing operation of the present invention has improved output performance since degradation of the membrane electrode assembly M2 is less, and resistance of the membrane electrode assembly M2 is reduced.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present invention should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

The invention claimed is:

1. A method for manufacturing a membrane electrode assembly for a fuel cell, the method comprising:
   an electrode forming step including coating an electrode slurry on a support to form an electrode layer;
   a transfer step including (i) aligning the electrode layer on a surface of an electrolyte membrane to form a stack, (ii) mounting the stack on a base plate, and (iii) applying heat and pressure to the stack so as to transfer the electrode layer to the electrolyte membrane; and
   a step of removing the support,
   wherein, in the transfer step, a gas pressure platen of a stretchable material comes into contact with the support, and then gas pressure is directly applied to the gas pressure platen of the stretchable material using a chamber having gas filled therein, wherein the gas pressure platen is a silicone pad or a silicon rubber pad, wherein the base plate is a metallic plate including a first heater and a first cooling line therein, and wherein the chamber includes a second heater for heating the gas and a second cooling line for cooling the gas.

2. The method of claim 1, wherein the gas filled in the chamber is air.

3. The method of claim 1, wherein the gas pressure platen comes into contact with the support by forming a vacuum between the support and the gas pressure platen.

4. The method of claim 1, wherein the transfer step is performed at a transfer temperature of 50 to 200° C. and a transfer pressure of 5 to 200 kgf/cm$^2$.

5. The method of claim 1, wherein the support includes any one selected from the group consisting of a polytetrafluoroethylene film, an imide film, a polyester film, a polyimide film, a polyamide film, a polyolefin film, a chlorine or fluorine-substituted polyolefin film, a perfluorinated polyolefin copolymer film, and a vinyl-based polymer film.

6. The method of claim 1, wherein the electrode forming step further includes drying the electrode slurry at a temperature of from room temperature to 150° C. after coating the electrode slurry on the support.

7. The method of claim 1, wherein a plurality of electrode layers with different thicknesses are formed in the electrode forming step, and, in the transfer step, the plurality of electrode layers are transferred using the gas pressure platen at the same time.

8. The method of claim 1, wherein, in the electrode forming step, the electrode slurry is coated to a thickness of 5 to 200 μm on the support.

9. The method of claim 1, wherein the electrode slurry includes a slurry comprising a catalyst, an ionomer, and a solvent.

10. The method of claim 9, wherein the electrode slurry further includes a carbon-based material.

\* \* \* \* \*